(12) United States Patent
Rodgers et al.

(10) Patent No.: US 6,913,329 B1
(45) Date of Patent: Jul. 5, 2005

(54) ENDLESS RUBBER TRACK HAVING GUIDE LUGS WITH GUIDE LUG SUPPORT LAYER, AND VEHICLE CONTAINING SUCH TRACK

(75) Inventors: Michael Brendan Rodgers, Copley, OH (US); Ram Murthy Krishnan, Munroe Falls, OH (US); Ray Eugene Beery, Akron, OH (US); Paul Harry Sandstrom, Tallmadge, OH (US); Bill Bud Gross, Stow, OH (US); Lewis Timothy Lukich, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 221 days.

(21) Appl. No.: 09/685,372

(22) Filed: Oct. 10, 2000

Related U.S. Application Data

(63) Continuation-in-part of application No. 09/641,273, filed on Dec. 11, 2000, now abandoned.

(51) Int. Cl.⁷ .............................................. B60D 55/205
(52) U.S. Cl. ........................................................ 305/157
(58) Field of Search ............................ 305/157, 165, 305/178; 474/262, 263, 264, 250, 251; 525/79, 326.1, 331.9; 524/511

(56) References Cited

U.S. PATENT DOCUMENTS

| | | | | |
|---|---|---|---|---|
| 4,279,449 A | * | 7/1981 | Martin et al. | 305/35 EB |
| 5,513,683 A | * | 5/1996 | Causa et al. | 152/209 R |
| 5,898,047 A | * | 4/1999 | Howald et al. | 152/209 |
| 5,984,438 A | | 11/1999 | Tsunado et al. | 305/169 |
| 6,056,656 A | * | 5/2000 | Kitano et al. | 474/268 |
| 6,153,686 A | * | 11/2000 | Granatowicz et al. | 524/511 |
| 6,251,992 B1 | * | 6/2001 | Sandstrom | 525/79 |

FOREIGN PATENT DOCUMENTS

| | | | | |
|---|---|---|---|---|
| EP | 0989161 | | 3/2000 | ............ C08L/9/00 |
| EP | 1120335 | | 8/2001 | ........... B62D/55/24 |
| JP | 11199710 A | * | 7/1999 | |

* cited by examiner

Primary Examiner—Frantz F. Jules
(74) Attorney, Agent, or Firm—Henry C. Young, Jr.

(57) ABSTRACT

The invention relates to an endless vehicular rubber track. The invention particularly relates to such track having hard rubber guide lugs with a softer guide support layer. It is to be appreciated that such guide lugs may also be positively driven drive lugs. The invention further relates to a vehicle having such track.

14 Claims, 2 Drawing Sheets

Figure 5:
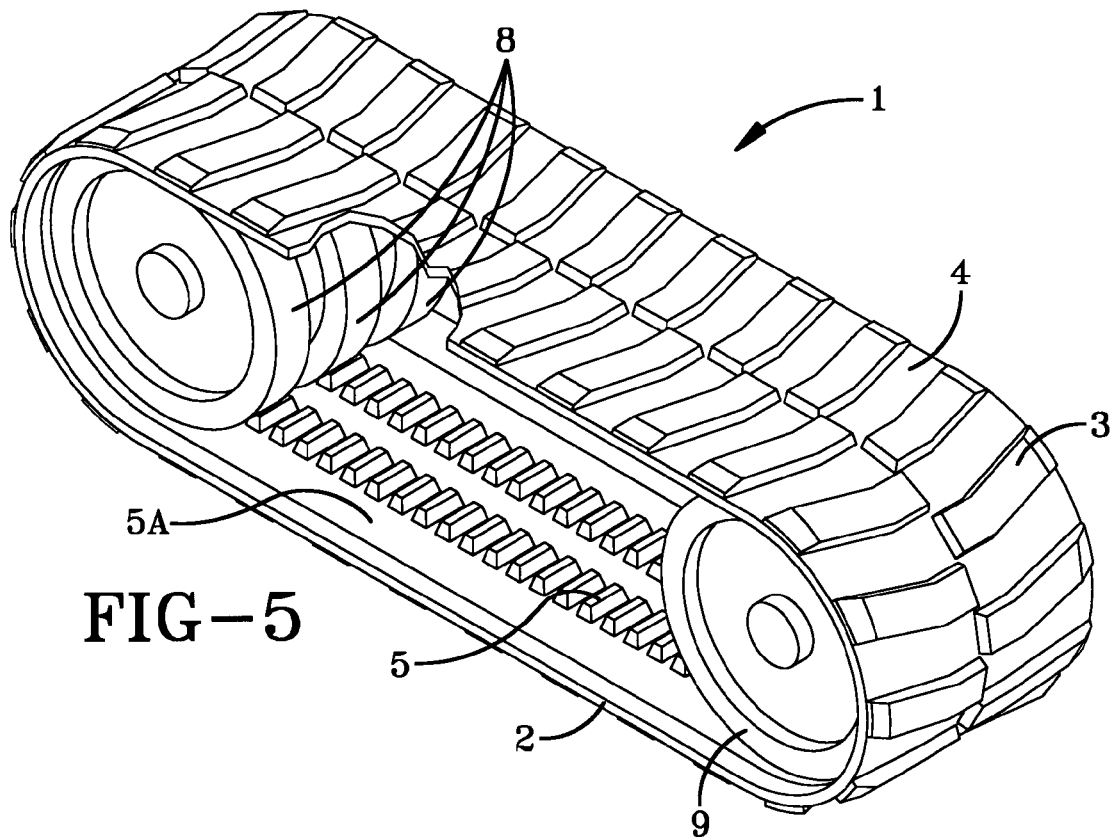
Figure 6:
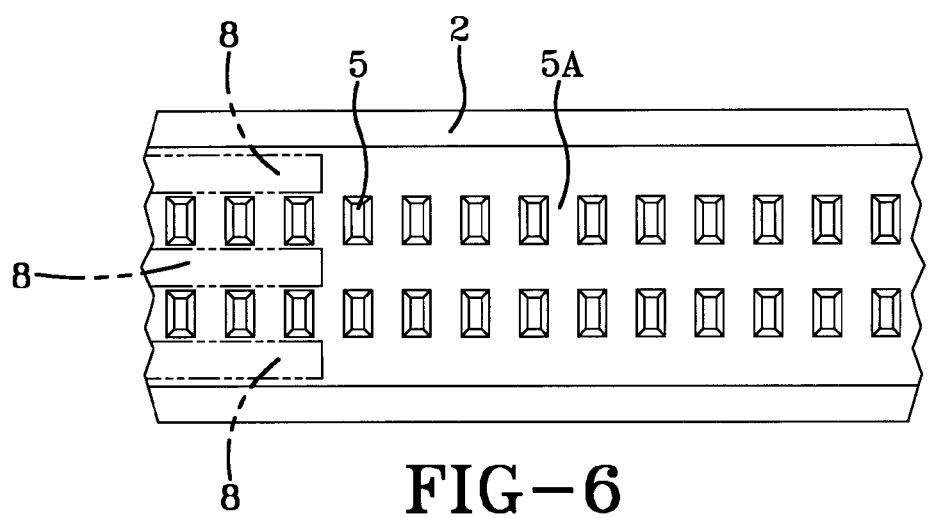

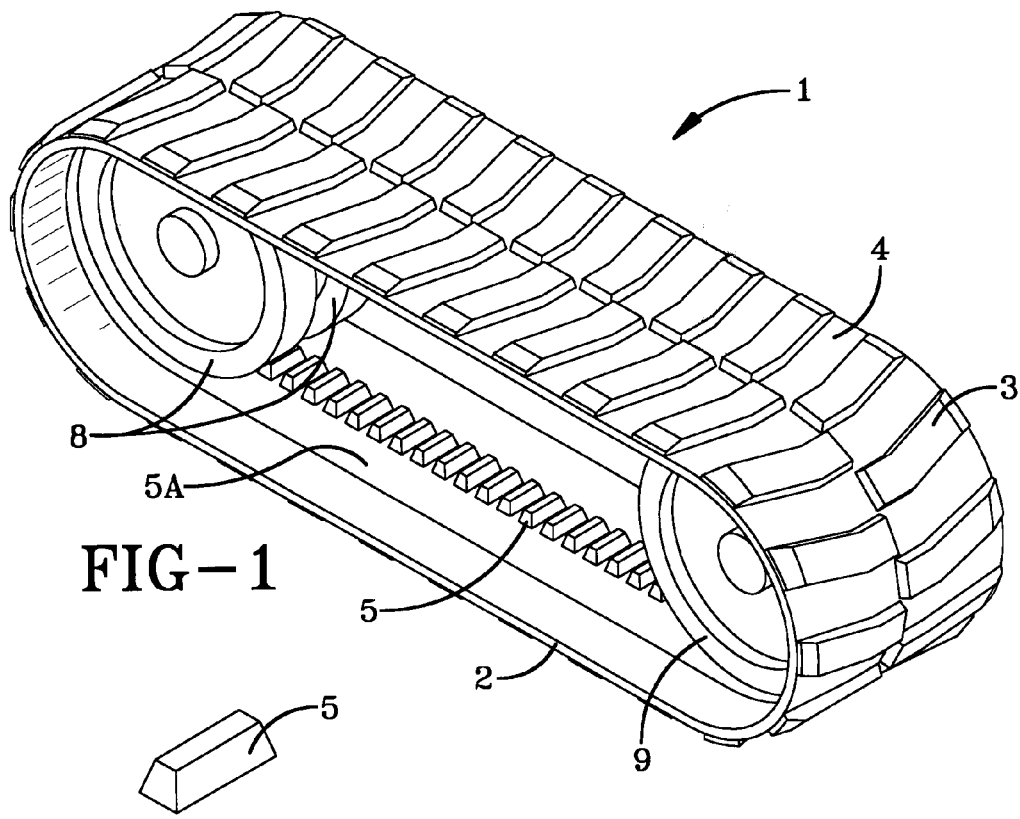
FIG-1
FIG-2
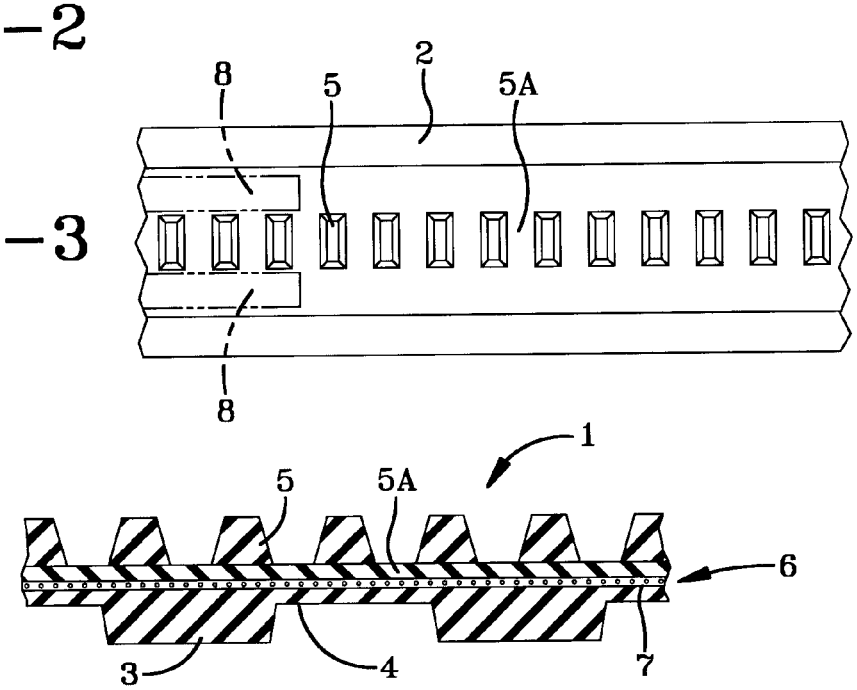
FIG-3
FIG-4

US 6,913,329 B1

ENDLESS RUBBER TRACK HAVING GUIDE LUGS WITH GUIDE LUG SUPPORT LAYER, AND VEHICLE CONTAINING SUCH TRACK

This application is a continuation-in-part of Ser. No. 09/641,273 filed Dec. 11, 2000, now abandoned.

FIELD OF INVENTION

The invention relates to an endless vehicular rubber track. The invention particularly relates to such track having hard rubber guide lugs with a softer guide support layer. It is to be appreciated that such guide lugs may also be positively driven drive lugs. The invention further relates to a vehicle having such track.

BACKGROUND OF THE INVENTION

Endless rubber tracks are increasingly being used for propelling various vehicles over the ground such as, for example, various tractors and other agricultural vehicles including, for example, combines and spreaders, as well as various earth moving machines.

For the vehicle, such rubber track is conventionally positioned over at least two vehicular wheels, normally a drive wheel for engaging an inner surface of the rubber track and driving the track and at least one vehicular driven wheel to aid in guiding the contorted path of the rubber track as it moves around the vehicular wheels to propel the associated vehicle over the ground.

The outer surface of the rubber track, namely its tread, is intended to be ground contacting and typically contains a plurality of raised rubber lugs designed to contact, or engage, the ground.

The inner surface of the track typically contains a plurality of spaced-apart relatively hard rubber lugs which normally serve as guide lugs and which, for some vehicular drive wheel configurations, may also serve as drive lugs to be driven by the associated vehicular drive wheel and such lugs are generally referred to herein as guide lugs even if they are utilized as positively driven drive lugs.

The hard rubber guide lugs serve to guide the rubber track around the aforesaid vehicular drive wheel and guide wheels. In such case, the vehicular drive wheel typically drives the track by its friction against the inner surface of the track. It might sometimes be referred to as a friction drive, or friction driven track. Such hard rubber lugs positioned on the inner surface of the track are referred to herein as guide lugs.

As discussed above, the vehicular drive wheel may be designed to actually engage the hard rubber lugs to drive the track and thereby propel the associated vehicle over the ground. Such hard rubber lugs may sometimes be used as drive lugs, although they also serve as guide lugs and are therefore simply referred to herein as guide lugs.

Where the guide lugs for the track are of a relatively hard rubber and where the surface of the track onto which they are positioned are of a somewhat softer rubber, imitation and propagation of cracks in the rubber surface of the track between the hard rubber lugs may potentially occur. In particular, as the rubber track is driven around the aforesaid vehicular wheels, it is subject to extensive contorted flexing and, therefore, its guide hard rubber lugs are subject to potential crack initiation and propagation at a juncture region on the rubber surface of the track where such lugs join the rubber track.

Accordingly, it is desired that the region of the inner surface of the track which joins the hard rubber guide lugs are somewhat softer yet still have an appropriate resistance to flex fatigue, resistance to tearing and resistance to crack propagation.

In the description of the invention, the term "phr" relates to parts by weight of a particular ingredient per 100 parts by weight of rubber contained in a rubber composition.

The terms "rubber" and "elastomer" are used interchangeably unless otherwise indicated. And the terms "cure" and "vulcanize" may be used interchangeably unless otherwise indicated.

SUMMARY AND PRACTICE OF THE INVENTION

In accordance with this invention, an endless rubber track designed to encompass a combination of at least one vehicular drive wheel and at least one vehicular guide wheel is provided wherein said rubber track has an outer tread comprised of a plurality of raised rubber lugs designed to be ground engaging and an inner surface comprised of a plurality of spaced apart rubber guide lugs designed to be guided and/or engaged by said vehicular drive wheel, and a rubber guide lug support layer, wherein said guide lugs are positioned on and co-vulcanized and integral with said guide lug supporting rubber layer, wherein said guide lug support layer is positioned on and integral with the inner surface of said rubber track; and wherein said guide lug support layer is of a rubber composition comprised of, based upon 100 parts by weight elastomers (phr), (A) elastomers comprised of
 (1) about 30 to about 70 phr of cis 1,4-polyisoprene natural rubber and, correspondingly,
 (2) about 70 to about 30 phr at least one additional elastomer selected from
  (i) about 30 to about 70, alternatively about 40 to about 60, phr of cis 1,4-polybutadiene rubber and, correspondingly,
  (ii) about zero to about 20, alternatively about 5 to about 15, phr of styrene/butadiene copolymer rubber which contains from about 10 to about 40 weight percent bound styrene; wherein said additional elastomer is preferably only an organic solution polymerization prepared elastomer,
(1) about 30 to about 70 phr of reinforcing filler selected from rubber reinforcing carbon black and synthetic amorphous silica comprised of about 40 to about 70, alternately about 40 to about 60, phr of said carbon black and from zero to about 50, alternately about 10 to about 40, phr of said silica, and
(C) a coupling agent for said silica having a moiety which is reactive with hydroxyl groups (silanol groups) contained on the surface of said silica and another moiety interactive with said diene based elastomer(s).

In practice, said guide lugs are typically of a sulfur cured diene based rubber composition having a Shore A hardness in a range of about 60 to about 90 and said sulfur cured guide lug support rubber layer typically has a Shore A hardness in a range of about 60 to about 90, alternately about 55 to about 85; wherein said guide support rubber layer has a hardness of at least about 5 Shore A hardness units less than the hardness of said rubber guide lugs.

In practice, it is preferred that the rubber composition for the guide lug support layer has the following physical properties, namely, ultimate tensile strength in a range of about 15 to about 19 MPa, ultimate elongation in a range of about 500 to about 750 percent, a 300 percent modulus in a range of about 5 to about 14 MPa, a hot rebound value in a range of about 35 to about 55 and a peel adhesion (to itself) according to ASTM D4393 test greater than 40 Newtons.

In practice, it is preferred that said additional elastomer is cis 1,4-polybutadiene rubber in order to aid in promoting, or enhancing, flex fatigue and abrasion resistance properties of the guide lug support rubber layer.

Preferably, as a limitation to the above rubber composition, such rubber composition for said guide lug support rubber layer is characterized by having a minimum flex fatigue resistance of at least about 60 kilocycles at 65 percent strain according to ASTM D4482.

The desired flex fatigue characterization for the guide lug support layer is considered herein to be important or significant to the durability and service life of the rubber track.

For the purposes of this invention, said guide lug support layer has a width of at least about 0.25 cm wider than said drive lugs with which it is associated wherein said gum strip normally has a width in a range of about 15 to about 25 cm, depending upon the width of the associated drive lugs and the width of the track in general. In practice, the guide lug support layer has a thickness in a range of about 0.1 cm to about 1.0 cm, preferably about 0.1 cm to about 0.4 cm.

In further accordance with this invention, a vehicle is provided having at least two endless rubber track systems, namely a track system on each side of the vehicle, for driving said vehicle over the ground, said track systems individually comprised of the track of this invention, a plurality of wheels engaged with said vehicle and encompassed by said track wherein at least one of said wheels is a drive wheel.

In one aspect of the invention, said drive wheel may engage said guide lugs of said track. Accordingly, said track is thereby driven by said drive wheel to propel the associated vehicle over the ground.

Alternately, said drive wheel may drive said track around said drive wheel by friction of the outer, peripheral surface of said drive wheel in contact with the inside surface of the track, which may be said guide lug support layer, and thereby propel the associated vehicle over the ground; whereby said guide lugs of said track act to guide the track by passing through an appropriate indentation, or groove, in or between said drive wheel(s).

The prescribed combination of elastomers, carbon black, and silica of the track's cured rubber guide support layer is considered herein to be important or significant to aid in achieving good field performance (e.g.: resistance to flex fatigue).

Preferred aspects of the practice of this invention include:

(1) use of a combination of natural rubber and cis 1,4-polybutadiene rubber designed to promote tear strength and flex fatigue resistance, (2) relatively low to medium level (content) of sulfur curative designed to promote lower modulus and higher elongation of the rubber composition, (3) amorphous silica in order to promote, or enhance, relatively low heat generation and resistance to tear initiation and propagation and flex fatigue resistance.

(4) relatively high antioxidant content, usually a combination of antioxidant and antiozonant, in order to achieve suitable long term ozone/age resistance and resistance to flex fatigue and (5) relatively low level of rubber processing oil, if any, in order to promote a relatively high tensile strength, tear resistance and abrasion resistance of the rubber composition.

Indeed, while the individual ingredients are known, it is considered that the above combination of ingredients for the guide lug support layer of the endless track for this invention is novel.

The track, including its guide lugs and associate guide lug support layer, is then sulfur cured (vulcanized) in a suitable mold at an elevated temperature (e.g.: about 135° C. to about 170° C.).

Accordingly, the invention also contemplates a sulfur-vulcanized endless track.

Further, the invention contemplates a vehicle having at least two endless rubber track systems (each on an opposite side of the vehicle) for driving said vehicle over the ground, said track systems individually comprised of said track, a plurality of wheels engaged with said vehicle and encompassed by said track wherein at least one of said wheels is a drive wheel.

In practice, it is to be appreciated that substantial difference in hardness of the guide lugs and the inner surface of the track presents significant problems resulting from the contortional and flexing stress placed at the juncture of the guide lugs and inner surface of the track. Accordingly, the inclusion of the specified guide lug support layer of this invention is designed to substantially reduce crack propagation in the inner track surface at or near at such juncture.

By this invention, such endeavor is undertaken by providing the specified guide lug support layer on the inner surface of the track itself. For such purpose, it is important that the underlying guide support layer has a sufficient flex fatigue resistance property to resist propagation of cracks should they should form, as the track contorts around the various drive and driven (idler) wheels of the associated vehicle.

Indeed, it is considered herein that use of such specified guide lug support layer rubber composition for an endless track is novel, inventive and a departure from past practice.

In the practice of this invention, a relatively high level, or content, of antidegradant is preferably used, namely, in a range of about 3 to about 8 phr in order to enhance resistance to flex fatigue and ozone resistance over time for the guide lug support layer rubber composition. Such antidegradants should be a combination of antiozonant and antioxidant for rubber compositions as conventionally used for cured rubber compositions intended to be exposed to atmospheric conditions in dynamic applications.

Representative examples of such antidegradants are, for example, polymerized 2,2,4-trimethyl 1,2-dihydroquinoline which might be obtained as Flectol TMQ from the Flexsys America L.A. company, N-1,3-dimethylbutyl-M-phenyl para-phenylenediamine which might be obtained as Santoflex 13, a trademark of Flesys Company and mixed aryl-p-phenylenediamines such as Wingstay® 100, a trademark of The Goodyear Tire & Rubber Company. Such antidegradants are well known to those having skill in such art.

Use of aromatic hydrocarbon rubber processing oils, such as, but not limited to, aromatic, naphthenic and paraffinic, in a range of zero to about 10, preferably about 2 to about 8, phr is desired for the practice of this invention in order to enhance processability of the unvulcanized rubber composition for the guide lug support rubber layer as well as to enhance a balance of a combination of tensile strength, tear resistance and abrasion resistance of the sulfur-vulcanized rubber composition. Such aromatic rubber processing oil as well as mixtures of alkylated napthenic and aromatic hydrocarbon rubber processing oils, and their use as processing aids, are well known to those having skill in the preparation of rubber compositions.

In the practice of this invention, silica, particularly precipitated silica, is used primarily to assist in enhancing, or reducing, tear resistance of the track tread's rubber composition. Various silicas may be used, preferably precipitated silicas. Precipitated silicas for use in rubber compositions, including for tire treads, are well known to those skilled in such art. Representative of such silicas are, for example, HiSil 210 from PPG Industries. In the practice of this invention, preferably a silica coupler is used. While various coupling agents may be used, representative coupling agents are, for example bis (3-triethoxysilylpropyl) polysulfides having from 2 to 8 with an average of from 2 to about 2.6 or from 3.5 to 4 connecting sulfur atoms in the polysulfidic bridge. Sometimes such coupler with an average of from 2 to about 2.6 connecting sulfur atoms in its polysulfidic bridge may be preferred.

It is readily understood by those having skill in the art that the rubber composition of the guide support layer may be compounded by methods generally known in the rubber compounding art, such as, unless otherwise specified herein, mixing the sulfur-vulcanizable constituent diene-based elastomers with various commonly-used additive materials such as, for example, curing aids, such as sulfur, activators, retarders and accelerators, processing additives, such as the aforesaid aromatic rubber processing oils, resins including tackifying resins if used, plasticizers if used, fatty acid including stearic acid, zinc oxide, waxes, antioxidants and antiozonants as discussed herein, peptizing agents if used, and reinforcing fillers such as carbon black and precipitated silica as discussed herein. As known to those skilled in the art, depending on the intended use of the sulfur vulcanizable and sulfur-vulcanized compounds or tread compounds, the additives mentioned above are selected and commonly used in conventional amounts unless otherwise specified for the track lug support layer of this invention.

Typical amounts of tackifier resins, if used, may be, for example, about 1 to about 5 phr, usually about 1 to about 3 phr. Typical amounts of processing aids, if used, may be about 1 to about 10 phr. Such processing aids can include, for example, the aforesaid aromatic rubber processing oil which includes a combination, of rubber processing oil. Typical amounts of fatty acids, if used, which can include stearic acid may be, for example, about 0.5 to about 4 phr. Typical amounts of zinc oxide may be, for example, about 2 to about 7 phr. Typical amounts of waxes if used, such as microcrystalline waxes may be, for example, about 1 to about 5 phr. Typical amounts of peptizers, if used, may be, for example, about 0.1 to about 1 phr. Typical peptizers may be, for example and if used, pentachlorothiophenol and dibenzamidodiphenyl disulfide.

The vulcanization is conducted in the presence of a sulfur, e.g. free sulfur, accelerator and, optionally, a secondary accelerator and/or retarder in the practice of this invention and in which a semi-EV vulcanization system might be used.

If a secondary accelerator is used, the secondary accelerator may be, for example, a guanidine, dithiocarbamate or thiuram compound.

A portion of the selection and amounts of the various compounding ingredients are important as hereinbefore described. Otherwise the selection and amounts may be adjusted or modified by the practitioner as deemed suitable for the desired track drive lug support layer gum properties.

The track can be built, shaped, molded and cured by various methods which are known or apparent to those having skill in such art.

The rubber composition, or compound, for the drive lug support layer for the rubber track may be prepared, for example, by mixing the ingredients in several sequential non-productive stages (without the sulfur and associated accelerators curatives) in an internal rubber mixer to temperatures of about 165° C., with a cooling of the composition to a temperature below 40° C. between mixing stages, followed by a final productive mixing stage in an internal rubber mixer to a temperature of about 105° C. in which the sulfur curatives are added.

The resulting uncured rubber compounds may then be extruded or calendered to form, a thin, rubber strip which is to become a support layer for the guide lugs. The rubber strip may be applied to a building drum where the rubber track is built. Thereafter, the individual, pre-shaped, uncured, rubber guide lugs are positioned in a spaced apart configuration onto the rubber gum strip to form an assembly thereof such as, for example, via use of an appropriate template to assure a consistent spaced apart configuration of the guide lugs. The track assembly is then vulcanized to form the track and to thereby make the guide lug support layer integral with the inner rubber surface of the track and to make the individual rubber drive lugs integral with the rubber drive lug support layer. In practice one or more sections of the track may, in turn, be inserted into a suitable mold and cured at a temperature of for example, about 150° C. to form a continuous track.

EXAMPLE I

Rubber compositions are prepared referred to herein as Samples W, X, Y and Z, wherein Samples W and X are used as Control Samples.

In particular, Control Samples W and X are based upon an elastomer composition of cis 1,4-polyisoprene natural rubber and styrene/butadiene copolymer rubber which contain a combination of carbon black and silica reinforcement.

Control Sample W is representative of a hard rubber composition with a cured Shore A hardness of about 91.

Control Sample X is representative of a somewhat softer rubber composition with a cured Shore A hardness of about 65.

Samples Y and Z are representative of the rubber compositions having cured Shore A hardnesses of 73 and 65, respectively and are therefore softer than the hard Control rubber composition X and similar in hardness to Control rubber composition X.

In particular, Samples Y and Z rubber compositions represent rubber compositions for the guide lug support layer of this invention and are based upon an elastomer composition of cis 1,4-polyisoprene natural rubber and styrene/butadiene rubber with carbon black reinforcement for Sample Y and an elastomer composition of cis 1,4-polyisoprene natural rubber and cis 1,4-polybutadiene rubber, together with a combination of carbon black and silica reinforcement for Sample Z.

The compositions for the Samples are shown in the following Table 1.

For the rubber composition, the ingredients are first mixed in at least one non-productive mixing stage for about five minutes to a temperature of about 155° C. to about 165° C. The non-productive mix stages refer to the mixing of the ingredients without the curatives such as sulfur and vulcanization accelerators. The term "non-productive" mixing is well known to those having skill in such art. Then the sulfur curative, together with accelerator(s), is mixed in a final mixing stage for about 2 minutes to a temperature of about 110° C. to about 120° C.

TABLE 1

|  | Sample W Control | Sample X Control | Sample Y | Sample Z |
|---|---|---|---|---|
| Non-Productive Mixing |  |  |  |  |
| Cis 1,4-polyisoprene natural rubber[1] | 80 | 80 | 15 | 50 |
| SBR rubber[2] | 20 | 20 | 85 | 0 |
| Cis 1,4-polybutadiene rubber[3] | 0 | 0 | 0 | 50 |
| Carbon black (A)[4] | 50 | 0 | 0 | 0 |
| Carbon black (B)[5] | 0 | 48 | 60 | 0 |
| Carbon black (C)[6] | 0 | 0 | 0 | 30 |
| Coupling agent[7] | 2 | 2 | 0 | 5 |
| Silica[8] | 12 | 7 | 0 | 30 |
| Zinc oxide | 5 | 4 | 3 | 3 |
| Fatty acid | 3.5 | 3.5 | 1 | 3 |
| Microcrystalline wax[9] | 1.25 | 1 | 0 | 3 |
| Paraffinic wax[10] | 1 | 0 | 0.33 | 1.5 |
| Tackifier resin[11] | 0 | 1 | 5 | 3 |
| Naphthenic oil[12] | 2 | 0 | 0 | 2 |
| Reactive resin[13] | 10 | 0 | 0 | 0 |
| Antidegradants[14] | 0.75 | 2.75 | 3 | 6 |
| Productive Mixing |  |  |  |  |
| Sulfur[15] | 1.75 | 1.5 | 0.9 | 1.0 |
| Accelerators[16] | 1.35 | 1.5 | 2.35 | 1.1 |

[1]Natural cis 1,4-polyisoprene rubber
[2]Emulsion polymerization prepared styrene/butadiene rubber as PLF1502 from The Goodyear Tire & Rubber Company having a styrene content of about 23.5% and a glass transition temperature (Tg) of about −55° C.
[3]Cis 1,4-polybutadiene rubber as Budene ® 1208 from the Goodyear Tire & Rubber Company
[4]N330 carbon black, an ASTM designation
[5]N220 carbon black, an ASTM designation
[6]N205 carbon black, an ASTM designation
[7]a 50/50 composite of bis (3-ethoxysilylpropyl) tetrasulfide and N330 carbon black as X50-S from the Degussa Company
[8]As HiSil ® 210 from the PPG Industries
[9]As M4067 from the Schumann Company
[10]As R4042 from the Schumann Company
[11]As SP1068-Special from Schenectady International
[12]As Stan-Plas 150 from the Lyondell Company
[13]Phenolformaldehyde type from the AkroChem Company
[14]Antidegradant of the hydroquinoline (TMQ) and para-phenylenediamine (6PPD) types
[15]Rubber Maker's sulfur
[16]Sulfenamide type(s)

EXAMPLE II

The rubber compositions of Example I were cured for about 100 minutes at a temperature of about 150°C. Various physical properties of the rubber compositions were measured and reported in the following Table 2. The term "MDR" means moving die Rheometer.

TABLE 2

Rubber Sample Properties

|  | Sample W Control | Sample X Control | Sample Y | Sample Z |
|---|---|---|---|---|
| Property |  |  |  |  |
| 300% Modulus (MPa)[1] | 15.5 | 12.3 | 5.7 | 6.4 |
| Tensile (MPa)[1] | 18.0 | 19.6 | 15.7 | 17.7 |
| Elongation (%)[1] | 375 | 439 | 655 | 631 |
| Rebound (100° C.)[2] | 47 | 55 | 38 | 49 |
| Hardness, Shore A[3] | 90.8 | 64.7 | 73.3 | 65 |
| DIN Abrasion resistance at 10 Newtons (mm³ loss)[4] | 139 | — | 138 | 59 |
| Fatigue flex test (kilocycles to failure) at 65 percent strain[5] | 22.2 | 81.7 | 144 | 144 |
| Hot peel adhesion to self (N/mm)[6] | 14.6 | 30.2 | 55.8 | 54 |
| Hot peel adhesion to Control Sample W (N/mm)[6] | 14.6 | 18.5 | 17.4 | 17 |
| Molded groove tear (Newtons)[7] | 13.7 | 12.2 | 44.0 | 34.4 |
| MDR at 150° C. |  |  |  |  |
| T25 | 6.41 | 4.12 | 6.66 | 7.64 |
| T90 | 27.71 | 8.30 | 16.17 | 20.62 |
| Delta torque | 33.97 | 14.63 | 7.97 | 10.42 |

[1]Tensile strength, elongation at break and 300% modulus were measured according to ASTM Test D412 (ring sample option) and are considered herein as a measure of the strength of the rubber compositions. Higher values are usually indicative of greater durability. For example, a tensile strength greater than 16 MPa is desired for the rubber guide lug support layer composition of the track of this invention.
[2]The Rebound test (ASTM D1054) provides a measure of hysteretic properties of the rubber compositions. A higher value is indicative of a less hysteretic running rubber composition which is preferred. A guide lug support layer rubber composition with higher rebound value would be expected to exhibit a lower operating temperature when used in service.
[3]The Shore A hardness (ASTM D2240) for the respective Samples.
[4]The abrasion test (ASTM D5963), somewhat similar to a DIN abrasion test, is indicative of wear due to abrasion, measured by loss of the rubber composition, and a lower value is better which indicates greater resistance to wear for the guide lug support layer.
[5]Kilocycles to fatigue flex failure (ASTM D4482) is indicative of resistance to fatigue cracking for a rubber composition and a higher value is preferred for the guide lug support layer rubber composition. Testing in this instance used a 65 percent strain level.
[6]Peel adhesion comparison is a measure of tear strength values for Samples W, X, Y and Z. Tests were conducted for peel adhesion of the respective Samples to themselves. Tests were also conducted for peel adhesion of Control Sample X and Samples Y and Z to Control Sample W. Higher values are preferred. Tear strength improvement for Sample Z (to itself) is in the order of 400 percent as compared to Control Sample X (to itself) and is considered to be predictive of the rubber support's resistance to crack propagation. Peel adhesion values of Samples X and Y to Control Sample W are shown to be significantly higher than the adhesion value of Control Sample W to itself. A description of the peel adhesion test may be found in U.S. Pat. No. 5,310,921 and ASTM D4393 (except that a sample width of 1.3 cm is used and a clear Mylar plastic window of a 5 mm width is inserted in the test sample used.
[7]The median molded groove tear strength of vulcanized rubber is measured according to ASTMD624 in which a rectangularly shaped cured rubber samples is obtained having a groove along its longitudinally central axis which basically divides the sample into two halves, namely one half on each side of the center of the groove. The test sample dimension is 2.54 cm wide, 12.7 cm long and 0.64 cm thick. The molded groove has an arc configuration of 14 degrees with a depth of 0.086 cm and a top groove width of 0.084 cm. The test is conducted by measuring the force, in Newtons, to initiate and propagate a tear along the groove in which the halves of the sample, at the one end of the sample, are pulled apart at 180° C. angle at a crosshead speed of about 51 cm per minute at about 23° C.

It can be seen from Table 2 that Samples Y and Z show superior flex fatigue and peel adhesion as compared to Control Samples W and X.

It can also be seen from Table 2 that the molded groove tear strength of Samples Y and Z are substantially superior to Control Samples W and X.

In particular, the following physical properties of the relatively softer Samples Y and Z, are observed as compared to those of relatively harder Control Samples W and X.

1. Elongation is substantially greater at break,
2. Resistance to fatigue failure is substantially greater; and 3. Peal adhesion and molded groove tear values are substantially greater.

Peel adhesion for Samples Y and Z to themselves and to Control Sample W was significantly superior as compared to Control Samples W to itself. This is considered herein to be beneficial as being suggestive of greater durability of a rubber composition for the guide lug support layer for the track which is expected to undergo extensive flexing when used in combination with the associated rubber guide lugs.

In one aspect of the invention, it is considered that various of the indicated physical properties of Samples Y and Z, and particularly Sample Y, are achieved via a combination of 1. replacement of the styrene/butadiene rubber in Sample Y with cis 1,4-polybutadiene rubber and an increased amount of the natural rubber for Sample Z; and 2. use of a carbon black with higher colloidal properties, namely a tint value of about 131, higher nitrogen adsorption value of about 130, for Sample Z (N205 carbon black) as to the carbon black (N220) for Sample Y, although the contribution of the N205 carbon black is not entirely understood.

It is important to appreciate that varying selection and amounts of ingredients in a rubber composition involves many trade-offs insofar as resultant rubber composition properties is concerned, particularly since it is often not reasonably possible to achieve all of desired physical properties for a guide lug support layer rubber composition.

For endless track treads of this invention, a primary objective is to maximize flex life and minimize crack formation and/or propagation for the underlying guide lug support layer which supports the associated rubber guide lugs.

While certain representative embodiments and details have been shown for the purpose of illustrating the invention, it will be apparent to those skilled in this art that various changes and modifications may be made therein without departing from the spirit or scope of the invention.

What is claimed is:

1. An endless rubber track designed to encompass a combination of at least one vehicular drive wheel and at least one vehicular guide wheel is provided wherein said rubber track has an outer tread comprised of a plurality of raised rubber lugs designed to be ground engaging and an inner surface comprised of a plurality of spaced apart rubber guide lugs designed to be guided and/or engaged by said vehicular drive wheel, and a rubber guide lug support layer, wherein said guide lugs are positioned on and co-vulcanized and integral with said guide lug supporting rubber layer, wherein said guide lug support layer is positioned on and integral with the inner surface of said rubber track; and wherein said guide lug support layer is of a rubber composition comprised of, based upon 100 parts by weight elastomers (phr), (A) said elastomers comprised of
  (1) about 30 to about 70 phr of cis 1,4-polyisoprene natural rubber and, correspondingly,
  (2) about 70 to about 30 phr at least one additional elastomer comprised of
    (i) about 30 to about 70 phr of cis 1,4-polybutadiene rubber and, correspondingly,
    (ii) about zero to about 20 phr of styrene/butadiene copolymer rubber which contains from about 10 to about 40 weight percent bound styrene;
(B) about 30 to about 70 phr of reinforcing filler selected from rubber reinforcing carbon black and synthetic amorphous silica comprised of about 40 to about 70 phr of said carbon black and from zero to about 50 phr of said silica, and (C) a coupling agent for said silica having a moiety which is reactive with hydroxyl groups (silanol groups) contained on the surface of said silica and another moiety interactive with said diene based elastomer(s).

2. The rubber track of claim 1 wherein said additional rubber is comprised of about 40 about 60 phr of cis 1,4-polybutadiene rubber and from about 5 to about 15 phr of organic solution polymerization prepared styrene/butadiene rubber and where said reinforcing filler is comprised of about 40 to about 60 phr carbon black and from about 10 to about 40 phr of precipitated silica.

3. The track of claim 2 wherein said guide lugs are of a of a sulfur cured diene based rubber composition having a Shore A hardness in a range of about 60 to about 90 and said sulfur cured guide lug support rubber layer has a Shore A hardness in a range of about 60 to about 90, wherein said guide support rubber layer has a hardness of at least about 5 Shore A hardness units less than the Shore A hardness of said rubber guide lugs.

4. A vehicle having at least two endless rubber track systems, namely a track system on each side of the vehicle, for driving said vehicle over the ground, said track systems individually comprised of the endless track of claim 3, a plurality of wheels engaged with said vehicle and encompassed by said track wherein at least one of said wheels is a drive wheel.

5. The track of claim 2 wherein said guide lug support layer rubber composition has a minimum flex fatigue resistance of about 60 kilocycles at 65 percent strain according to ASTM D4482.

6. The track of claim 2 wherein said guide lug support layer has a width of at least about 0.25 cm wider than said drive lugs with which it is associated wherein said guide lug support layer has a thickness in a range of about 0.1 cm to about 1.0 cm.

7. A vehicle having at least two endless rubber track systems, namely a track system on each side of the vehicle, for driving said vehicle over the ground, said track systems individually comprised of the endless track of claim 2, a plurality of wheels engaged with said vehicle and encompassed by said track wherein at least one of said wheels is a drive wheel.

8. The track of claim 1 wherein said guide lugs are of a of a sulfur cured diene based rubber composition having a Shore A hardness in a range of about 60 to about 90 and said sulfur cured guide lug support rubber layer has a Shore A hardness in a range of about 60 to about 90, wherein said guide support rubber layer has a hardness of at least about 5 Shore A hardness units less than the Shore A hardness of said rubber guide lugs.

9. The track of claim 1 wherein the rubber composition for the guide lug support layer has an ultimate tensile strength in a range of about 15 to about 19 MPa, an ultimate elongation in a range of about 500 to about 750 percent, a 300 percent modulus in a range of about 5 to about 14 MPa, a hot rebound value in a range of about 35 to about 55 and a peel adhesion (to itself) according to ASTM D4393 test greater than 40 Newtons and wherein said carbon black is a N205 (ASTM) carbon black.

10. The track of claim 1 wherein said guide lug support layer rubber composition has a minimum flex fatigue resistance of about 60 kilocycles at 65 percent strain according to ASTM D4482.

11. A vehicle having at least two endless rubber track systems, namely a track system on each side of the vehicle, for driving said vehicle over the ground, said track systems individually comprised of the endless track of claim 10, a plurality of wheels engaged with said vehicle and encompassed by said track wherein at least one of said wheels is a drive wheel.

12. The track of claim 1 wherein said guide lug support layer has a width of at least about 0.25 cm wider than said drive lugs with which it is associated wherein said guide lug support layer has a thickness in a range of about 0.1 cm to about 1.0 cm.

13. A vehicle having at least two endless rubber track systems, namely a track system on each side of the vehicle, for driving said vehicle over the ground, said track systems individually comprised of the endless track of claims 12, a plurality of wheels engaged with said vehicle and encompassed by said track wherein at least one of said wheels is a drive wheel.

14. A vehicle having at least two endless rubber track systems, namely a track system on each side of the vehicle, for driving said vehicle over the ground, said track systems individually comprised of the endless track of claim 1, a plurality of wheels engaged with said vehicle and encompassed by said track wherein at least one of said wheels is a drive wheel; wherein said drive wheel A. is adapted to engage said guide lugs of said track for thereby driving track around said drive wheel and to thereby propel the associated vehicle over the ground, or B. is adapted to drive said track by friction between the outer, peripheral surface of said drive wheel in contact with the inside surface of the track to drive said track around said drive wheel and to thereby propel the associated vehicle over the ground; whereby said guide lugs of said track act to guide the track by passing through an appropriate indentation, or groove, in or between said drive wheel(s).

* * * * *